S. OLMSTEAD.
FEED-BOILER.
No. 169,469. Patented Nov. 2, 1875.
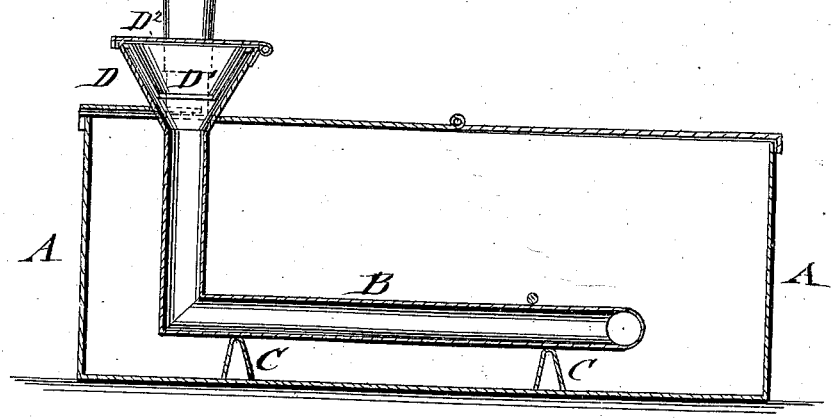
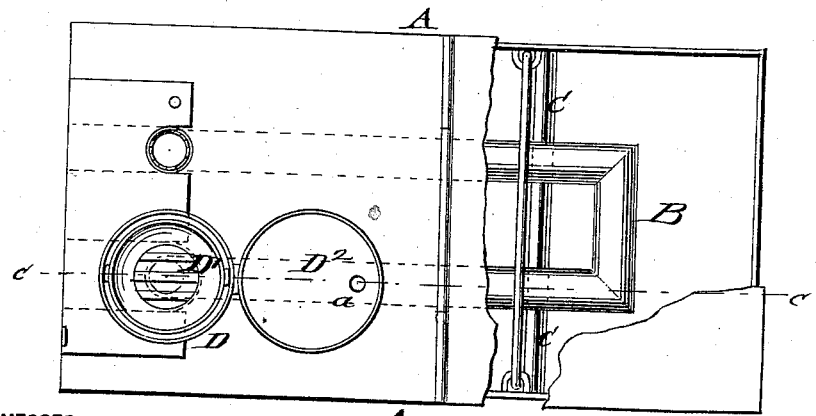

UNITED STATES PATENT OFFICE.

STARK OLMSTEAD, OF BROOK, INDIANA.

IMPROVEMENT IN FEED-BOILERS.

Specification forming part of Letters Patent No. 169,469, dated November 2, 1875; application filed July 31, 1875.

*To all whom it may concern:*

Be it known that I, STARK OLMSTEAD, of Brook, Newton county, Indiana, have invented a new and Improved Feed-Boiler, of which the following is a specification:

Figure 1 represents a vertical longitudinal section of my improved feed-boiler on the line $c$ $c$, Fig. 2; and Fig. 2, a top view of the same.

Similar letters of reference indicate corresponding parts.

The object of my invention is to provide an improved feed-boiler for agricultural purposes that is simple in construction and heats the feed-box in an economical manner.

The invention consists of a feed-box, in which is placed a heating-tube, that is provided at the outside at one end with a fireplace and grate, and at the other end with a draft-chimney.

In the drawing, A represents a feed-box, which may be made of wood or other suitable material, preferably, however, of tin. The feed to be boiled is placed therein and heated up by a square or rounded-off tube, B, that is supported on suitable standards, C, and securely held in position by a top rod or other fastening attachment. The feeding-tube B passes into the feed-box A from the top, being seated in apertures in the cover of the same, and provided with a funnel-shaped end, D, that carries a detachable basket, $D^1$, with grate for the fuel. A hinged lid, $D^2$, with air-holes $a$, closes the basket, and admits such a supply of air that a slow combustion only of the fuel is possible. The other end of the heating-tube B passes out of the feed-box near the funnel part, and is provided with a chimney, E, of such height that a continued draft of the gases of combustion is produced in the tube, and thereby the feed in the box heated and gradually boiled. The cover of the feed-box may be detached and the heating-tube be taken out for cleaning and removing the feed. Thus a simple feed-boiler for agricultural purposes is furnished, which combines cheapness, simplicity, and efficacy.

I do not claim, broadly, a feed-boiler consisting of a furnace or heater, and an inclosing tank or vessel.

Having thus described my invention, I claim as new and desire to secure by Letters Patent—

The combination, with box or tank A, of the bent tube B, arranged within the same, and the conical heater supported upon the top thereof, as shown and described.

STARK OLMSTEAD.

Witnesses:
 JAY W. WILLIAMS,
 PETER H. WARD.